United States Patent
Wong et al.

(10) Patent No.: US 9,623,481 B2
(45) Date of Patent: Apr. 18, 2017

(54) NANOSTRUCTURES HAVING ENHANCED CATALYTIC PERFORMANCE AND METHOD FOR PREPARING SAME

(75) Inventors: Stanislaus Wong, Stony Brook, NY (US); Christopher Koenigsmann, Stony Brook, NY (US)

(73) Assignee: THE RESEARCH FOUNDATION OF STATE UNIVERSITY OF NEW YORK, Albany, NY (US)

( * ) Notice: Subject to any disclaimer, the term of this patent is extended or adjusted under 35 U.S.C. 154(b) by 1522 days.

(21) Appl. No.: 13/267,704

(22) Filed: Oct. 6, 2011

(65) Prior Publication Data

US 2012/0088656 A1    Apr. 12, 2012

Related U.S. Application Data

(60) Provisional application No. 61/390,421, filed on Oct. 6, 2010.

(51) Int. Cl.
| | | |
|---|---|---|
| B01J 23/38 | (2006.01) | |
| B22F 1/00 | (2006.01) | |
| B22F 9/18 | (2006.01) | |
| B82Y 30/00 | (2011.01) | |
| B82Y 40/00 | (2011.01) | |
| H01M 4/92 | (2006.01) | |

(52) U.S. Cl.
CPC ............ *B22F 1/0025* (2013.01); *B22F 9/18* (2013.01); *B82Y 30/00* (2013.01); *B82Y 40/00* (2013.01); *H01M 4/92* (2013.01)

(58) Field of Classification Search
CPC ............ B01J 23/38; B22F 9/18; B22F 1/0025
USPC ................................................ 75/370
See application file for complete search history.

(56) References Cited

U.S. PATENT DOCUMENTS

| | | | |
|---|---|---|---|
| 7,147,834 B2 | 12/2006 | Wong et al. | |
| 7,481,990 B2 | 1/2009 | Wong et al. | |
| 7,585,349 B2 * | 9/2009 | Xia et al. ...................... | 75/371 |
| 7,585,474 B2 | 9/2009 | Wong et al. | |
| 8,003,408 B2 * | 8/2011 | Zhang ..................... | B82Y 30/00 424/490 |

FOREIGN PATENT DOCUMENTS

JP    WO-2009107694 A1 *    9/2009

OTHER PUBLICATIONS

Koenigsmann et al., Ambient Surfactantless Synthesis, Growth Mechanism, and Size Dependent . . . , American Chemical Society NANO, 2011 pp. 7471-7487, vol. 5, No. 9.
Wong, et al., One-dimensional noble metal electrocatalysts: a promising structural paradigm for . . . , Energy & Environmental Science, Apr. 2011, pp. 1161-1176, vol. 4, No. 4.
Koenigsmann et al., Size Dependent Enhancement of Electrocatalytic Performance in Relatively Defect-Free, Processed . . . , American Chemical Society NANO, 2010, pp. 2806-2811.

(Continued)

*Primary Examiner* — Jie Yang
(74) *Attorney, Agent, or Firm* — Hoffmann & Baron, LLP

(57) ABSTRACT

Provided herein is a nanostructure refined by suspending an unrefined nanostructure with a solvent, dispersing the suspended nanostructure in an acidic solution and agitating the acidic solution to produce a refined nanostructure.

12 Claims, 17 Drawing Sheets

(56) References Cited

OTHER PUBLICATIONS

Chen, et al., Supportless Pt and PtPd Nanotubes as Electrocatalysts for Oxygen-Reduction Reactions, Angewandte Chemie Int. Ed. 2007, 46, pp. 4060-4063.
Zhou, et al., Enhanced Electrocatalytic Performance of One-Dimensional Metal Nanowires and Arrays Generated via an Ambient . . . , J. Phys. Chem. C 2009, 13, pp. 5460-5466.
Sun, et al., Controlled Growth of Pt Nanowires on Carbon Nanospheres and Their Enhanced Performance as Electrocatalysts in . . . , Advanced Materials, 2008, 20, pp. 3900-3904.
Shen, et al., Preparation of single-crystalline platinum nanowires with small diameters under mild conditions, The Royal Society of Chemistry, 2007, pp. 245-247.
Koenigsmann, et al., Enhanced Electrocatalytic Performance of Processed, Ultrathin, Supported Pd—Pt Core-Shell Nanowire . . . , J. Am. Chem. Soc., 2011, 133, pp. 9783-9795.

* cited by examiner

NANOSTRUCTURES HAVING ENHANCED CATALYTIC PERFORMANCE AND METHOD FOR PREPARING SAME

PRIORITY

This application claims priority to U.S. Provisional Application No. 61/390,421, filed with the U.S. Patent and Trademark Office on Oct. 6, 2010, the entire content of which is incorporated herein by reference.

BACKGROUND OF THE INVENTION

1. Field of the Invention

The present invention relates generally to noble metal nanostructures, and more particularly, to noble metal nanostructures having fewer surface defect sites, improved dispersibility, decreased diameter and improved electrocatalytic properties.

2. Description of the Related Art

Nanomaterials provide size-dependent optical, electronic, magnetic, thermal, mechanical, chemical, and physical properties, which are distinctive from their bulk counterparts as well as from the atomic or molecular precursors from which the nanomaterials were derived. (See Xia et al., Adv. Mater. 2003, 15, (5), 353-389; Mao et al., Small 2007, 3, (7), 1122-1139). A nanostructure is a material particle with one or more physical dimensions that are less than or equal to 100 nm. A nanostructure includes but is not limited to nanowires, nanotubes, nanoparticles, nanorods, nanospheres, nanofilm, nanocages, nanofibers, nanoflakes, nanoflowers, nanofoam, nanopillars, nanoplatelets, nanorings, nanoshells, nanoneedles, nanodendrites, nano-sea-urchins, nanopyramids, nanotriangles, and nanocubes.

A metallic nanostructure is a nanostructure with a chemical composition including any element or mixture of transition metals, including elemental, doped nanostructures, alloyed/solid-solution, and intermetallic nanostructures, as described below. A transition metal is a metal that falls within a set of metallic elements occupying a central d-block (Groups IVB-VIII, IB, and IIB, or 4-12) in the periodic table. Chemically, transition metals show variable valence and a strong tendency to form coordination compounds, and many of their compounds are colored. The noble metals are a subset of the transition metals that are resistant to corrosion and oxidation in moist air, unlike the other transition metals. Noble metals tend to be precious, often due to their rarity in the Earth's crust. The noble metals include platinum (Pt), palladium (Pd), ruthenium (Ru), rhodium (Rh), osmium (Os), iridium (Ir), silver (Ag), and gold (Au). Examples of transition metal nanostructures are described by U.S. Pat. No. 7,481,990 and U.S. Pat. No. 7,147,834, the contents of which are incorporated herein by reference.

Generally, there are four classifications of metallic nanostructures; an elemental metallic nanostructure, a doped metal nanostructure, an alloyed metal nanostructure, and an intermetallic nanostructure. An elemental metallic nanostructure is composed of a single transition metal and no other elements. Further, noble metals can be combined with other transition metals giving rise to the three additional classifications of noble metal nanostructures.

More specifically, a doped metal nanostructure is composed of a uniform solid mixture in which one primary transition metal element is combined with a quantity of another transition metal not exceeding 50% of the total composition, for the purpose of introducing new physical properties to the mixture or to enhance one or more of the physical properties of the primary transition metal. An alloyed metal nanostructure, also known as a Solid Solution Metal Nanostructure, is composed of a uniform solid mixture in which two or more transition metal elements can be combined into a single discrete nanostructure at any level of composition. An intermetallic nanostructure is composed of a mixture of two or more transition metal elements having a defined solid crystalline phase of the mixture different from that of the two transition metal elements.

A nanowire is a one-dimensional (1-D) nanostructure possessing two physical dimensions that are less than or equal to 100 nm with the third dimension being unconstrained with an aspect ratio defined as a ratio between the unconstrained dimension and the constrained dimensions, thereby providing a property of anisotropy. The concept of anisotropy is described further by U.S. Pat. No. 7,585,474, the content of which is incorporated herein by reference.

A growing demand for efficient, low-cost renewable energy has sparked great scientific interest in the development of nanomaterials for use as electrocatalysts in Oxygen Reduction Reactions (ORR). State-of-the-art ORR electrocatalysts include platinum zero-dimensional (0-D) nanoparticles supported on mesoporous carbon supports. However, there are several problems associated with 0-D, i.e., spherical or symmetrical, nanoparticle morphologies.

0-D nanoparticle morphologies maintain a proportionally larger number of lattice boundaries, defect sites and Low Coordination Atoms (LCAs) on their surfaces as compared with associated 1-D-type analogues. Defect sites and LCAs are less catalytically active than smooth crystal planes because of local differences in coordination geometry and surface energy, which can change, for example, the interface between exposed platinum atoms and the oxygen adsorbate. As a result, kinetics of these nanoparticulate electrocatalysts are slow due to an observed overpotential and catalytic inhibition due to adsorption of surface O-H groups at potentials below 1 V.

Moreover, 0-D electrocatalysts lack durability for long-term applications in fuel cells due to irreversible oxidation of surface atoms that occurs in defect sites. These factors contribute to high precious metal loadings of 0.4-0.8 mg/cm, rendering impractical use in commercialized fuel cells.

By contrast, single-crystalline, anisotropic 1-D structures possess: (a) high aspect ratios, (b) fewer lattice boundaries, (c) long segments of smooth crystal planes, and (d) a low number of surface defect sites and LCAs, all of which are desirable attributes for fuel cell catalysts. Moreover, the 1-D geometry allows for preferential exposure of low-energy crystal facets that are highly active in ORR. This factor contributes to a delay in surface oxidation at higher potentials, thereby enhancing ORR kinetics. In addition, 1-D structures maintain improved electron transport characteristics due to path directing effects of the structural anisotropy.

Further, 1-D morphologies lead to improved performance when platinum nanostructures are used as fuel cell electrocatalysts. Specifically, 1-D platinum nanostructures have fewer defect sites and have a higher number of surface atoms with the potential for higher degrees of coordination. In particular, one study found that small diameter platinum nanowires grown directly on an amorphous carbon support showed an area specific activity for the ORR of 275 $\mu A/cm^2$, which is more than three times that of a commercial nanoparticle cathode. (See Sun et al., Adv. Mater., 2008, 20, 3900-3904).

In addition, unsupported platinum nanotubes prepared by Yan et al. display a four-fold enhancement in area-specific activity compared with carbon-supported platinum nanoparticles. (See Yan et al, Agnew. Chem., Int. Ed., 2007. 46, 4060-4063). Moreover, Wong et al. demonstrate that unsupported, polycrystalline platinum nanotubes synthesized by a facile template directed method can more than double the area-specific ORR activity as compared with commercial carbon-supported platinum nanoparticles. (See Wong et al. J. Phys. Chem. C, 2009, 113, 5460).

Based on these advantages, nanostructures have attracted extensive synthetic attention as a result of their size-dependent properties. (See, for example, J. Hu, et al., Acc. Chem. Res., 1999, 32, 435; G. R. Patzke, et al., Angew. Chem., Int. Ed., 2002, 41, 2446; Y. Xia, et al., Adv. Mater., 2003, 15, 353; and C. N. Rao, Dalton Trans., 2003, 1). Part of the challenge of developing practical nanoscale devices and catalysts for a variety of applications is the ability to synthesize and characterize these nanostructures to rationally exploit their nanoscale optical, electronic, thermal, and mechanical properties. Ideally, the net result of nanoscale synthesis is the production of structures that achieve monodispersity, stability, and crystallinity with a predictable morphology. Many of the synthetic methods used to attain these goals have been based on principles derived from semiconductor technology, solid state chemistry, and molecular inorganic cluster chemistry.

However, a need still exists for a scalable method to synthesize ultra-thin, highly active noble metal catalysts with few surface defects and LCAs, particularly to minimize precious metal loading.

SUMMARY OF THE INVENTION

Accordingly, the present invention provides, inter alia, improved dispersibility of the nanostructures and uniform coating of substrates. Dispersion of the catalyst on substrates is confirmed by electron microscopy or alternatively by electrochemical analysis. Furthermore, an acid treatment is provided that results in a measurable decrease in nanostructure diameter and an increase of the nanostructure's electrocatalytic properties. The acid treatment of the present invention also selectively removes LCAs and defect sites along the single crystalline surfaces of noble metal nanostructures, rendering noble metal nanostructures, such as nanowires and nanoparticles, more active as catalysts and electrocatalysts.

An aspect of the present invention is to overcome the above shortcomings by providing an acid treatment protocol implemented to activate and exfoliate noble metal nanostructures, including noble metal nanowires and nanoparticles, by removing undesirable residues, LCAs and surface defects.

In accordance with an aspect of the present invention, a refined nanostructure is provided by suspending an unrefined nanostructure with a solvent, dispersing the suspended nanostructure in an acidic solution and agitating the acidic solution to produce a refined nanostructure.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
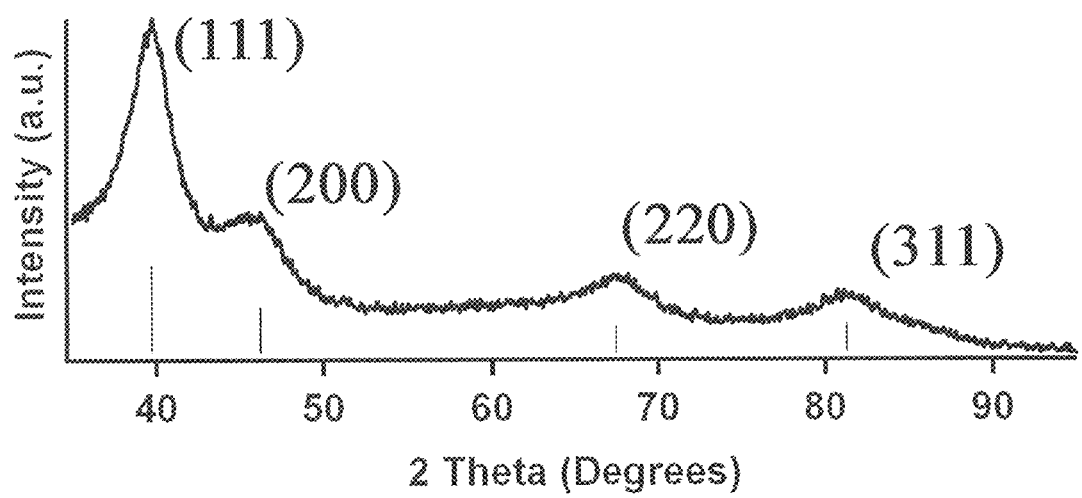
FIG. 1 is a graph of X-ray powder diffraction pattern of refined nanostructures.

The following detailed description of certain embodiments of the present invention will be made in reference to the accompanying drawings. In describing the invention, explanation about related functions or constructions known in the art are omitted for the sake of clearness in understanding the concept of the invention, to avoid obscuring the invention with unnecessary detail.

The use of nanostructures maximizes the surface area-to-volume ratio and therefore decreases the amount of catalytically inactive support material present within the interior of the nanomaterial. Further, for example, previous analysis of small diameter nanowires by Density Functional Theory (DFT) indicates that a nanowire undergoes a surface contraction when the diameter is decreased below a critical value of approximately 2 nm. Specifically, surface contractions of noble metals have been shown both experimentally and theoretically to improve the surface ORR activity, since such contractions weaken the binding of oxygen and increase the kinetics of oxygen reduction.

Enhancements in electrocatalytic performance can also be achieved by employing nanostructured catalysts with smooth surfaces possessing few defects and LCAs. The electrocatalytic performance toward the ORR has been studied on well-defined platinum single crystals and the Pt (111) surface facet maintains the highest oxygen reduction activity when compared with the Pt (100) and Pt (110) surface facets. The Pt (111) surface facet maintains the fewest defect sites and LCAs, when compared proportionally with the Pt (110) and Pt (100) surfaces. Also, the binding of adsorbates such as oxygen are weakest on the Pt (111) surface facet, rendering it more active toward electrocatalysis. Accordingly, the electrocatalytic performance of a nanostructured catalyst can be enhanced by removing defect sites and LCAs, rendering the surface of the structure more like that of the Pt (111) surface facet.

As a subset of transition metals, the noble metals maintain similar physical and chemical properties, particularly a high resistance to oxidation and corrosion of their surfaces under ambient conditions. Production of noble metal nanoparticles results in formation of surface residues composed of partially reduced noble metal compounds including but not limited to noble metal oxides and halides. A challenge in selectively removing these residues, defect sites, and LCAs from nanostructures is the development of refining methods that are sufficiently corrosive. In accordance with an embodiment of the present invention, an acid wash refining process is provided to refine noble metal nanostructures by etching and dissolving the surfaces of the nanostructure to reduce surface defects, LCAs and residues. In accordance with an embodiment of the present invention, platinum nanowires and nanoparticles are refined to provide enhanced catalytic properties.

Noble metal nanowires and nanoparticles synthesized in accordance with an embodiment of the method of the present invention provide improved electrocatalytic properties over commercially available noble metal nanoparticle catalysts. For example, unsupported platinum nanowire catalysts, synthesized according to the method described herein, which can be deposited on a glassy carbon substrate, have demonstrated a seven-fold enhancement in surface area normalized oxygen reduction activity when compared with commercial platinum nanoparticle catalysts. Additionally, unsupported platinum nanowire catalysts, synthesized according to an embodiment of the present invention as described herein, when deposited on a glassy carbon substrate, have demonstrated a two-fold enhancement in surface area normalized ethanol oxidation activity and enhanced stability when compared with commercial platinum nanoparticle catalysts.

In accordance with an embodiment of the present invention, a method reported by Shen et al. Chem. Commun., 2007, 245-247, is modified to improve ORR activity of metal nanostructures. For example, the synthesis of aggregated and unrefined small-diameter platinum nanowires of the synthetic route of Shen et al., is modified to yield smaller diameters and improved dispersibility in water, alcohols, and mixtures thereof.

Further, nanostructures are synthesized by dissolving a 2.5 mL aliquot of hexachloroplatinic (IV) acid hydrate ($H_2PtCl_6 \cdot xH_2O$, >99.9%, Aldrich) solution (10.0 mM, aqueous) in a solvent system including 20 mL dimethylformamide (EMD, anhydrous), 12.5 mL toluene (Acros, reagent grade), and 2.5 mL triethylamine (Fisher, reagent grade). The addition of 20 mg of sodium borohydride to a precursor solution reduces a platinum precursor, and the reaction was allowed to proceed for 3 hours while stirring. A resulting black product composed of unrefined nanowires (illustrated in FIG. 3), which are isolated from the solution by centrifugation, and washed several times with an alcoholic solvent, such as methanol or ethanol. Isolation can alternatively be provided by filtration or precipitation.

Prior to acid treatment, the aggregated unrefined nanostructures, e.g., 1 mg of nanowires, are dispersed in an amount of alcoholic solvent sufficient to uniformly disperse the unrefined nanostructures. Alternatively, the acid treatment may be scaled from 1 mg to 100 kg. For example, 0.1 mL of methanol, isopropanol or ethanol may be used. However, a volume of 0.1 mL-10 L of the alcoholic solvent can also be utilized. The acid treatment is then performed by adding approximately 5 mL of an acidic solution, e.g., 6 M HCl, to the solution of aggregated unrefined nanowires in the alcoholic solvent and uniformly dispersing the solid into this solution by mixing, for example, through sonication, physical or mechanical agitation, homogenization or stirring. Alternatively, the amount of the acid solution may include 5 mL to 500 L.

According to an embodiment of the present invention, the acidic solution may include hydrochloric acid, but may also include any acid that completely or nearly completely ionizes in water, e.g., Hydroiodic Acid, Hydrobromic Acid, Nitric Acid, Sulfuric Acid, Perchloric Acid, Phosphoric Acid, p-Toluenesulfonic acid, Chloric acid, Bromic acid, perbromic acid, iodic acid, per-iodic acid, as well as triflic acid and combinations thereof. Furthermore, the rate of the etching process can be controlled by the concentration of the acidic solution, where lower concentrations result in slower rates of etching.

Once uniformly dispersed, an indication of completion of the acid etching process is signaled by the transition of the color of the solution from transparent to a yellowish coloration, which is consistent with the presence of dissolved platinum. The rate and degree of completion may be monitored by UV-visible spectroscopy, wherein the emergence of a characteristic peak corresponding to dissolved platinum ($H_2PtCl_6$) in the UV-visible spectrum with a wavelength of maximum ($\lambda_{max}$) centered at 262 nm. Using the experimentally determined molar absorption coefficient derived by Beer's Law, the precise quantity of dissolved platinum can be determined, thereby giving direct quantitative insight into the rate and progress of platinum solubilization.

The use of UV-visible spectroscopy to monitor the progression of the acid-etching process also applies to noble metal nanostructures other than that of platinum. The characteristic peak associated with dissolved platinum (see FIG. 11.) is also observed on UV-visible spectra obtained from solutions containing other dissolved noble metals including palladium, rhodium, iridium and gold. The characteristic $\lambda_{max}$ for the various noble metals dissolved in solution have been found to exist within the range of 200 nm to 400 nm on the basis of prior literature. (For $IrCl_6^{2-}$-$\lambda_{max}$=232 nm, see Journal of Photochemistry and Photobiology A: Chemistry, V90 (1995) 31-37; For $PdCl_6^{2-}$-$\lambda_{max}$=305 nm, see Journal of the Chemical Society, 1959, 1505-1511; For $RhCl_6^{3-}$ $\lambda_{max}$=approximately 400 nm, see Bulletin of Chemical Society of Japan, V60 (1995), 1601-1605; For $AuCl_4^-$-$\lambda_{max}$=circa 300-350 nm, see Inorg. Chem., 1968, 7 (1), pp 55-58). Hence, the quantity of one or more noble metals dissolved and the corresponding degree of solubilization can be determined from the absorption at the $\lambda_{max}$ corresponding to those noble metals.

Once the acid treatment is complete, as determined either visually or by UV-visible spectroscopy, a two-step quenching process is started. In a first step, the nanostructures are immediately isolated after the solution has reached a solubility threshold from the acid etch solution by either centrifugation, precipitation, or filtration. The supernatant or filtrate is removed, leaving solid nanostructures with some residual acid content present. In a second step, the corrosion process is halted, or quenched, by immediately dispersing, either by sonication, mechanical stirring, or by physical/mechanical agitation, the nanostructures and any residual acidic supernatant into a polar solvent. A final product can be obtained by isolating the nanowires from the ethanol solvent using centrifugation, precipitation or filtration.

For example, the polar solvent may include ethanol, or may also include alcohols ($C_{1-20}OH$), dimethyl-formamide, dichloromethane, tetrahydrofuran, ethyl acetate, acetonitrile, dimethyl sulfoxide, acetone, formic acid, acetic acid, and combinations thereof. Finally, residual acid is removed by washing the product several times with water and ethanol, thereby yielding the final purified, exfoliated nanowire product.

In accordance with another embodiment of the present invention, the platinum precursor solution is reduced using 10 mg of sodium borohydride in a solvent system devoid of toluene. A resulting black solid is washed and treated using the above-described procedure.

The crystallinity and purity of the purified platinum nanowires obtained by the above-described method may be confirmed by use of X-Ray powder Diffraction (XRD). To prepare powder XRD samples, platinum nanowire samples are rendered into slurries in ethanol, sonicated for about 1 min, and air-dried upon deposition onto glass slides. Diffraction patterns are collected using a Scintag diffractometer, operating in the Bragg-Bretano configuration using Cu Kα radiation ($\lambda$=1.54 Å) from 35 to 95° at a scanning rate of 1° per minute. Results of the crystallographic analysis performed on the samples are shown in FIG. 1, with peaks indexed to the (111), (200), (220) and (311) reflections of the face-centered cubic platinum (Fm3m, JCPDS #04-0802). No detectable impurity peaks are observed in the XRD pattern. The thin vertical lines beneath the data trace represent a Joint Committee on Powder Diffraction Standard (JCPDS) standard for platinum ideal published peak position and intensity for a pure platinum standard.

Figure 2:
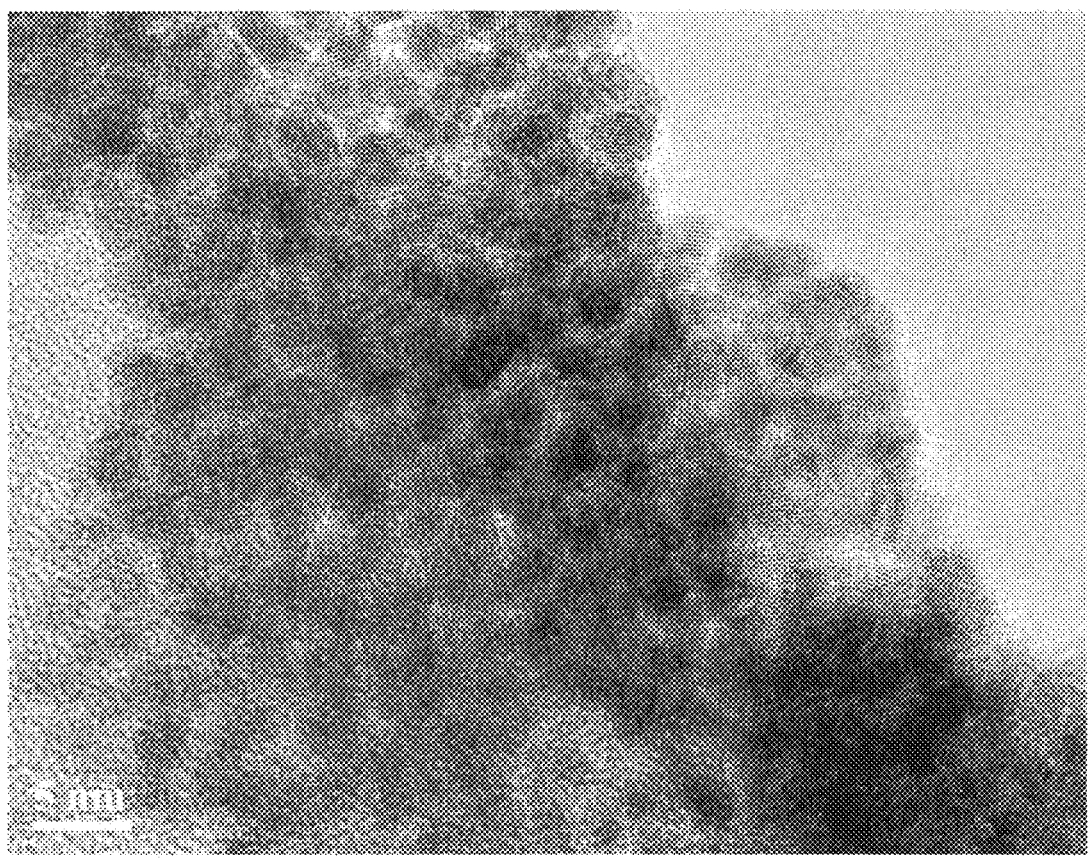
FIG. 2 is a Transmission Electron Microscopy (TEM) image of acid-washed platinum nanoparticles.
Figure 3:
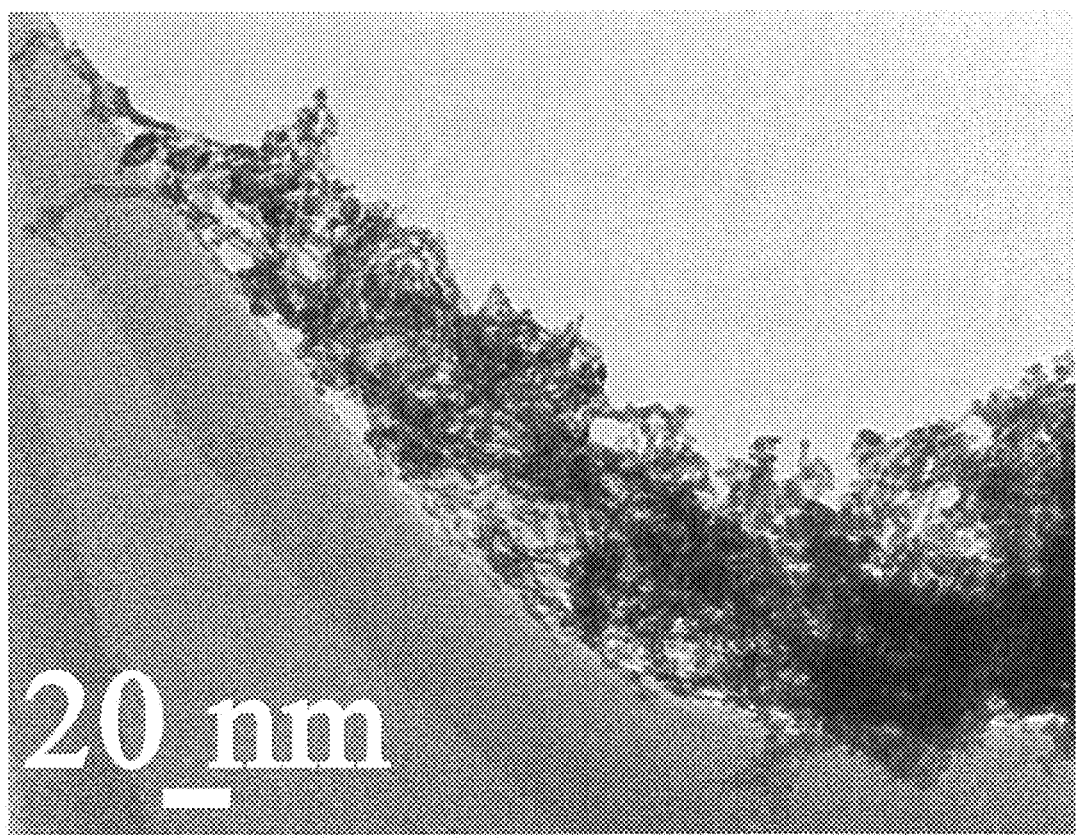
FIG. 3 is a TEM image of nanowires before acid washing.

Morphology of the nanoparticles obtained using the present invention is characterized by Transmission Electron Microscopy (TEM). FIG. 2 provides a TEM image of a sample of nanoparticles prepared by the reduction of the platinum precursor in a solvent without the presence of toluene followed by treatment with acid. These acid treated nanoparticles maintain an average diameter of 2.8±0.7 nm. In a separate reaction, the reduction of the platinum precursor in a solvent system containing toluene results in a majority of aggregated, unrefined nanowires (85-90%) forming a net-like structure with some nanoparticles distributed throughout the net, as shown in FIG. 3. The average diameter of these unrefined, aggregated nanowires before acid wash is determined from the TEM images to be 1.8±0.3 nm with an average length of 100±25 nm.

Figure 4:
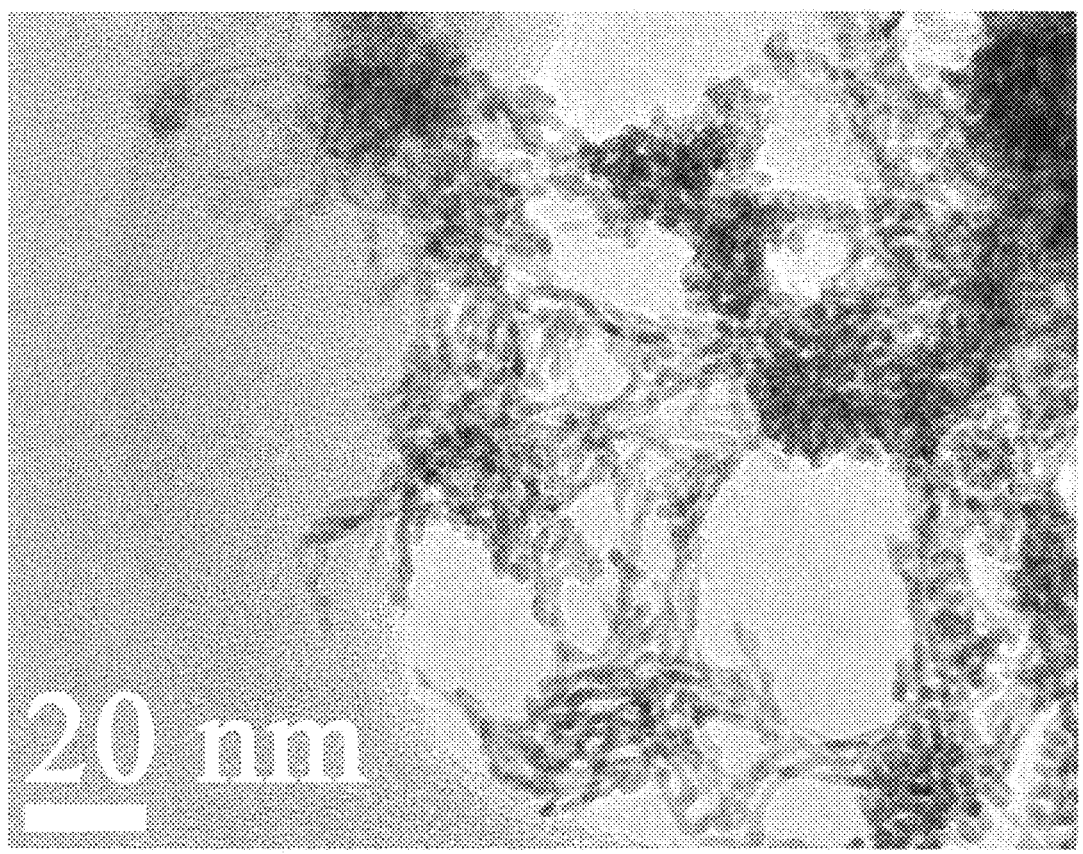
FIG. 4 is a TEM image of nanowires after the acid wash of the present invention.

Upon washing the unrefined wires with acid, the treated purified nanowires maintain a perceptibly decreased diameter of 1.3±0.4 nm with an associated drop in the level of aggregation. For example, the TEM image in FIG. 4 illustrates the presence of well-defined individual nanostructures. The nanostructures are polycrystalline, i.e., consist of multiple crystalline segments with an average length of 6±2 nm that extend along the axis of the nanostructure, as illustrated in the High-Resolution TEM (HRTEM) image in FIG. 5.

Figure 5:
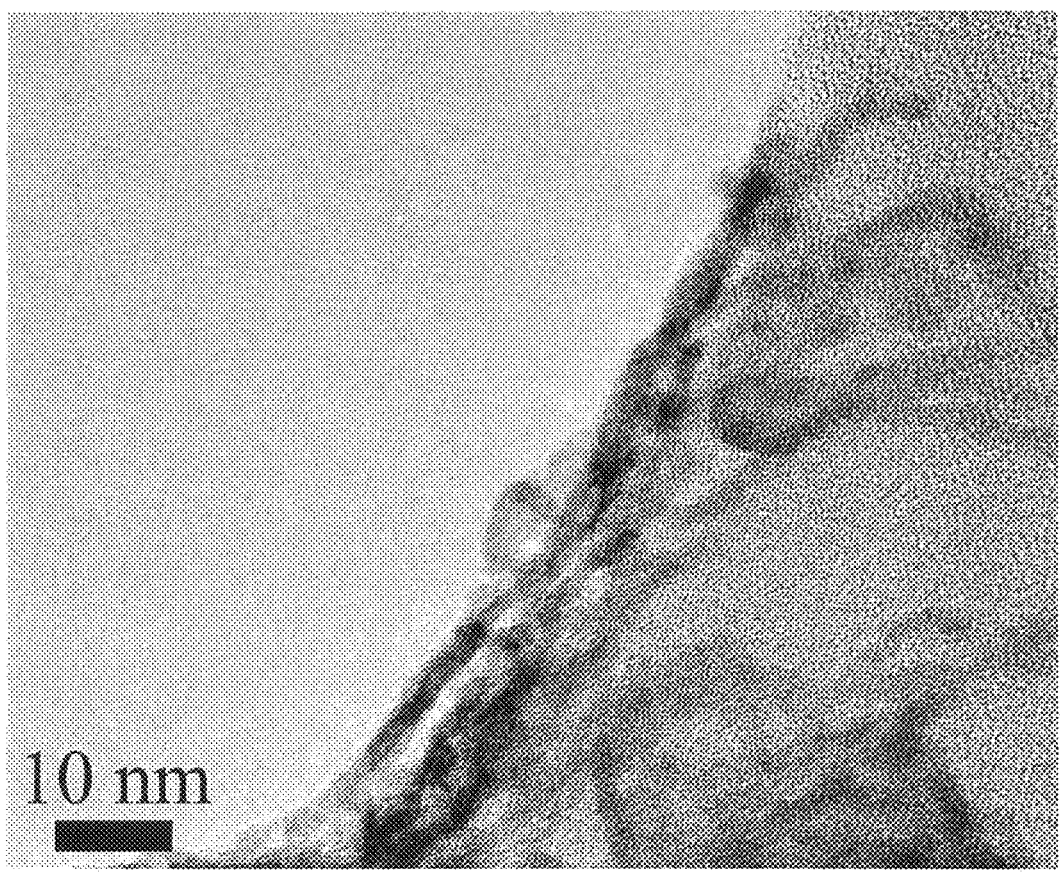
FIG. 5 is a high-resolution TEM image of a collection of refined platinum nanowires.
Figure 6:
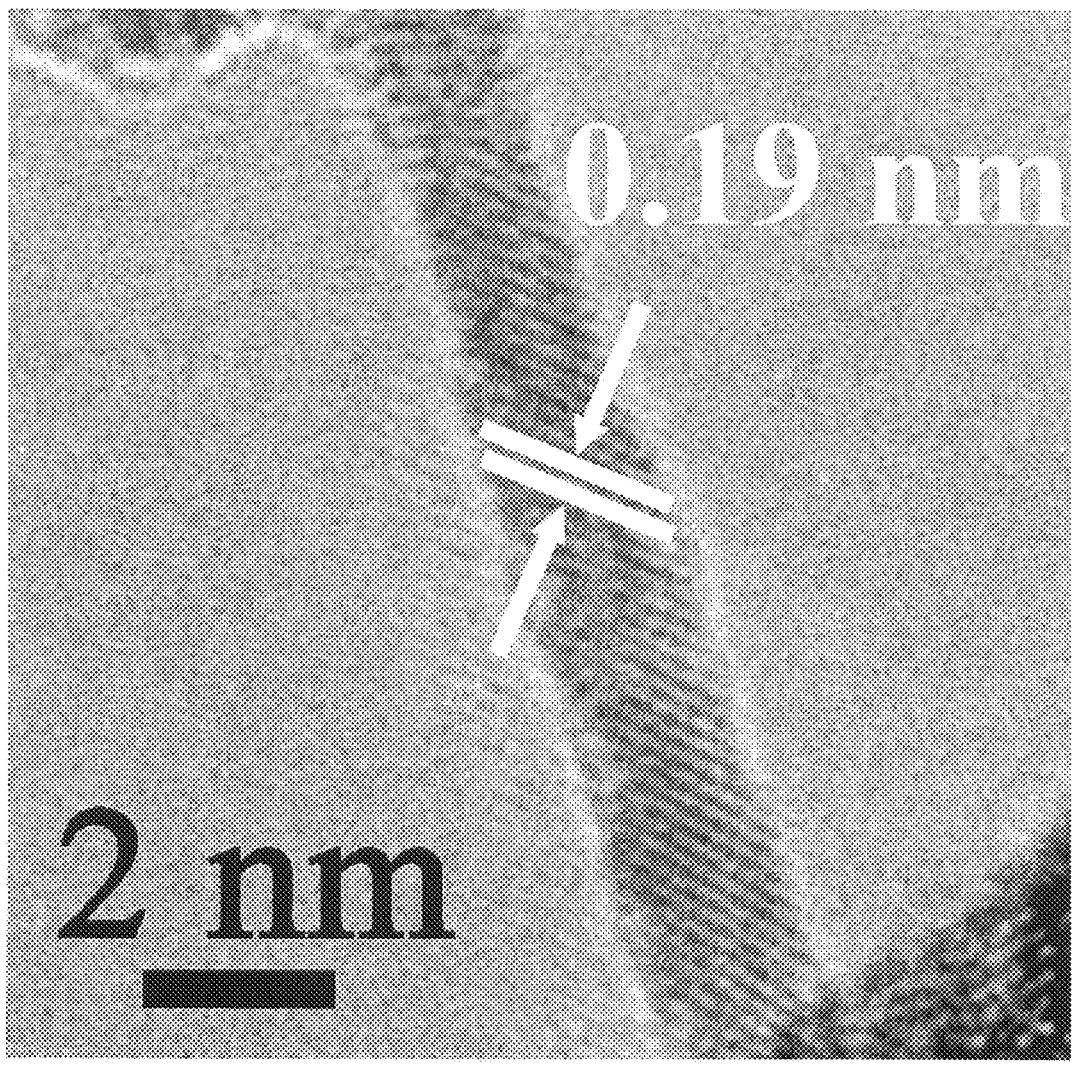
FIG. 6 is a high-resolution TEM image with lattice planes resolved on an individual refined nanowire.
Figure 7:
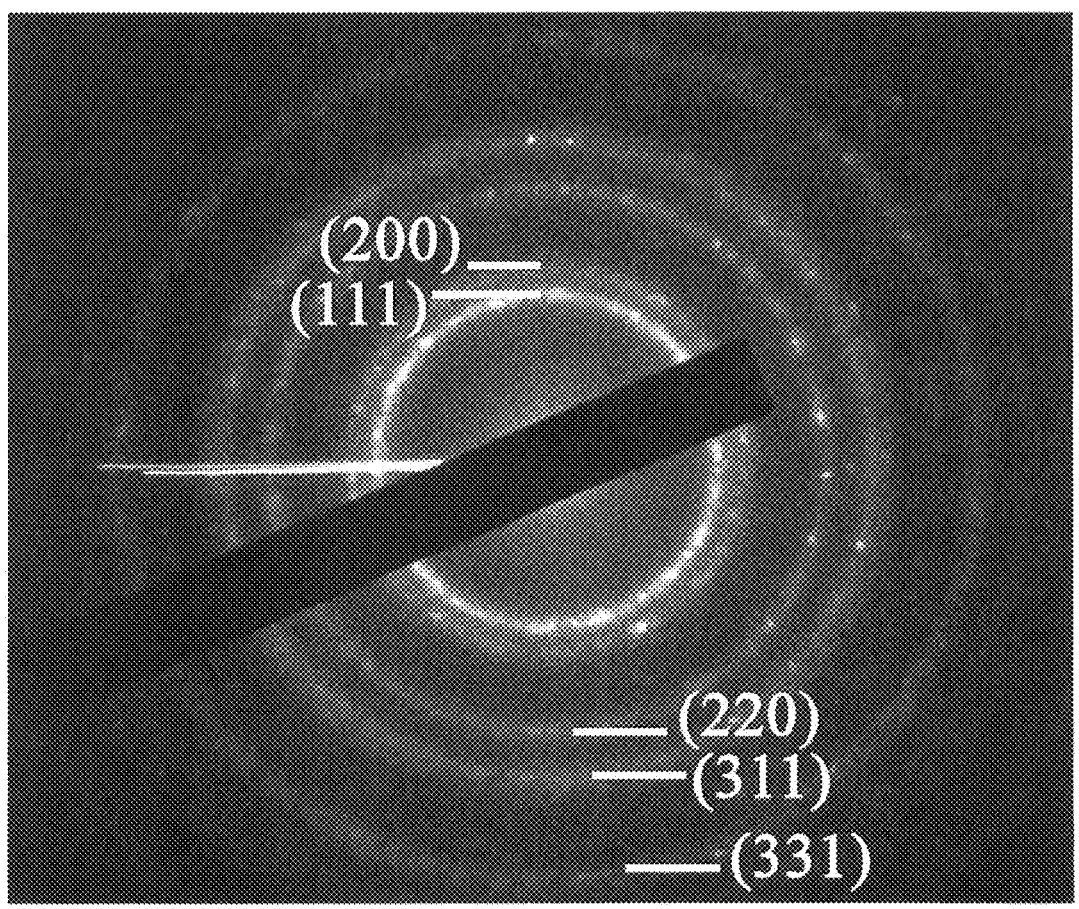
FIG. 7 illustrates Selected Area Electron Diffraction (SAED) obtained from the collection of platinum nanowires illustrated in FIG. 5.

Furthermore, FIG. 6 provides a HRTEM image illustrating a single nanowire with the lattice planes resolved. The majority of the single crystalline segments making up the nanostructures have lattice spacings of 0.23 nm and 0.19 nm, consistent with the (111) and (200) lattice planes, respectively, as illustrated in FIG. 5 and FIG. 6. The Selected Area Electron Diffraction (SAED) pattern illustrated in FIG. 7 highlights not only continuous rings that can be indexed to the platinum (111), (200), (220), (311), and (331) planes, but also highlights discrete diffraction spots. The presence of discrete diffraction spots within the rings indicates that the overall polycrystalline samples are composed of multiple single crystalline components, which contribute collectively to the measured diffraction pattern.

Figure 8:
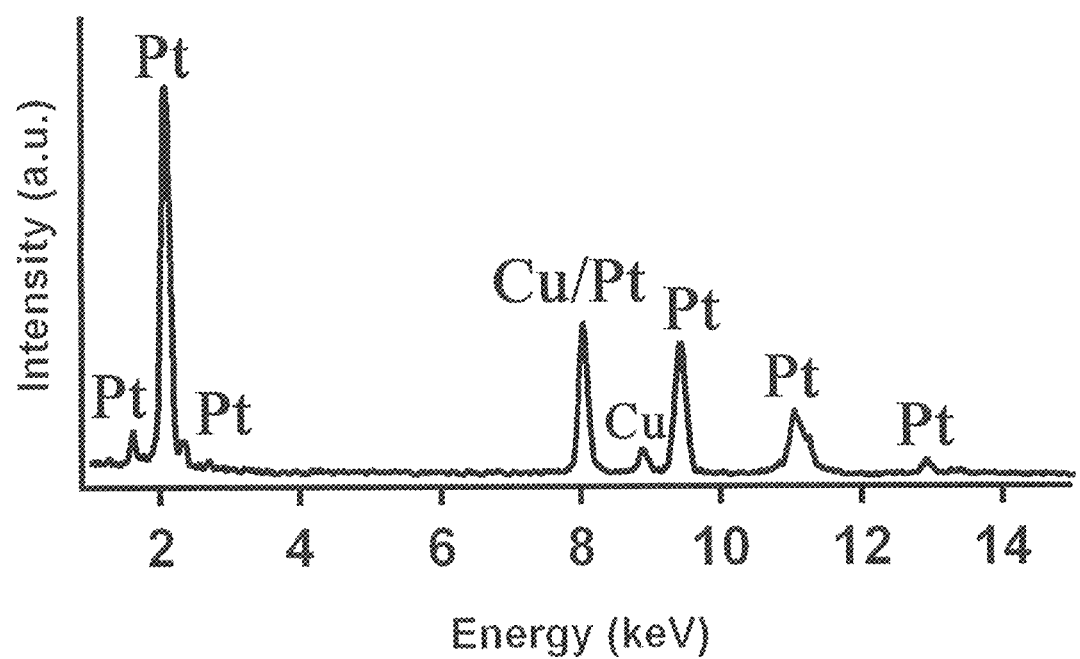
FIG. 8 is a graph of Energy Dispersive Analysis of X-rays (EDAX) patterns of refined nanowires according to an embodiment of the present invention.

FIG. 8 illustrates the chemical composition of individual nanowires investigated by energy dispersive X-ray spectroscopy, performed in scanning TEM mode with an electron beam size of 0.2 nm. The results shown in FIG. 8 suggest only the presence of platinum, with copper (Cu) peaks resulting from the TEM grid on which the platinum nanowires are placed for the purpose of obtaining TEM images.

The morphology and dimensions of the platinum nanoparticle samples are characterized using a field emission scanning electron microscopy instrument (Hitachi S-4800), operating at an accelerating voltage of 15 kV. Samples for Scanning Electron Microscopy (SEM) are prepared by dispersing samples in ethanol, sonicating for about one minute, and then depositing the sample onto a silicon wafer.

Figure 9:
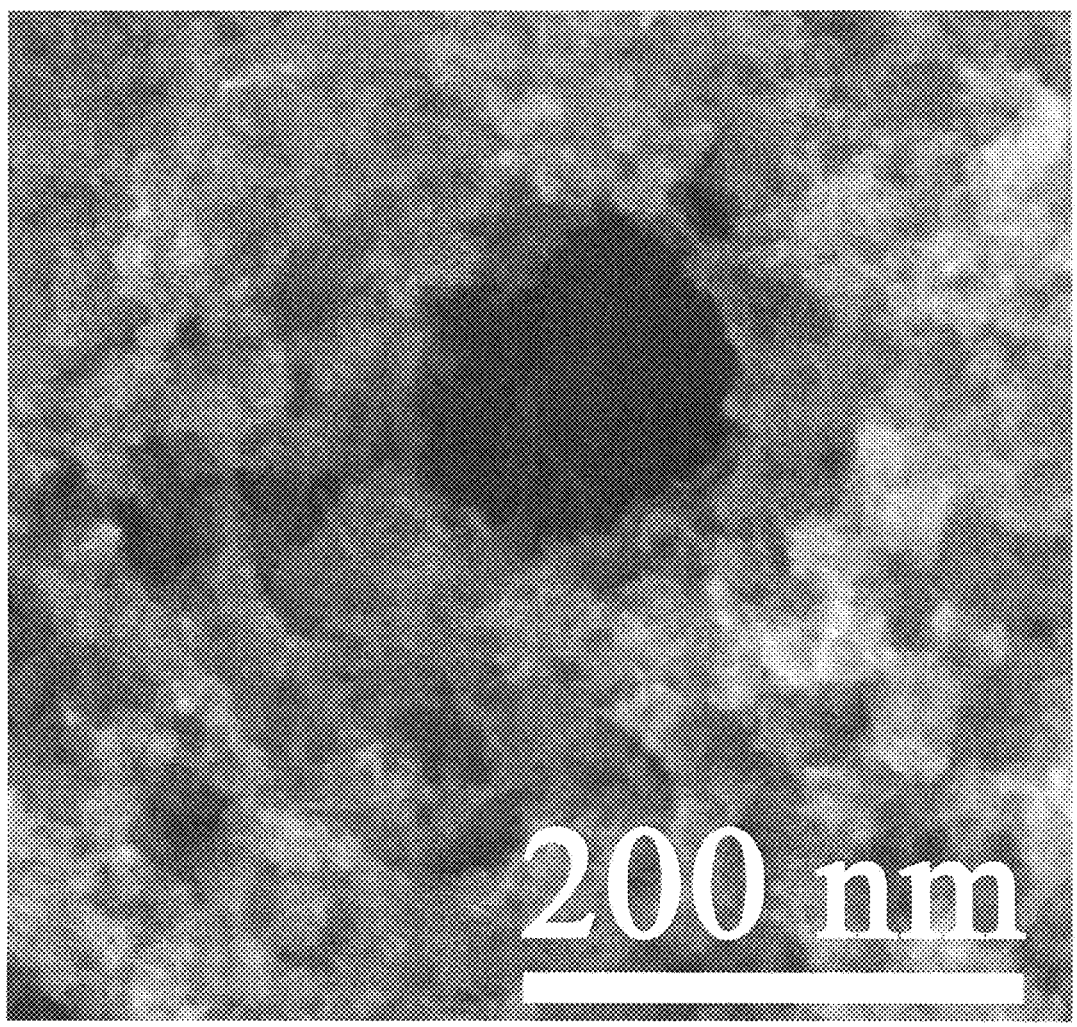
FIGS. 9-10 are Scanning Electron Microscope (SEM) images of nanowires washed with water and 6 M HCl, respectively.
Figure 10:
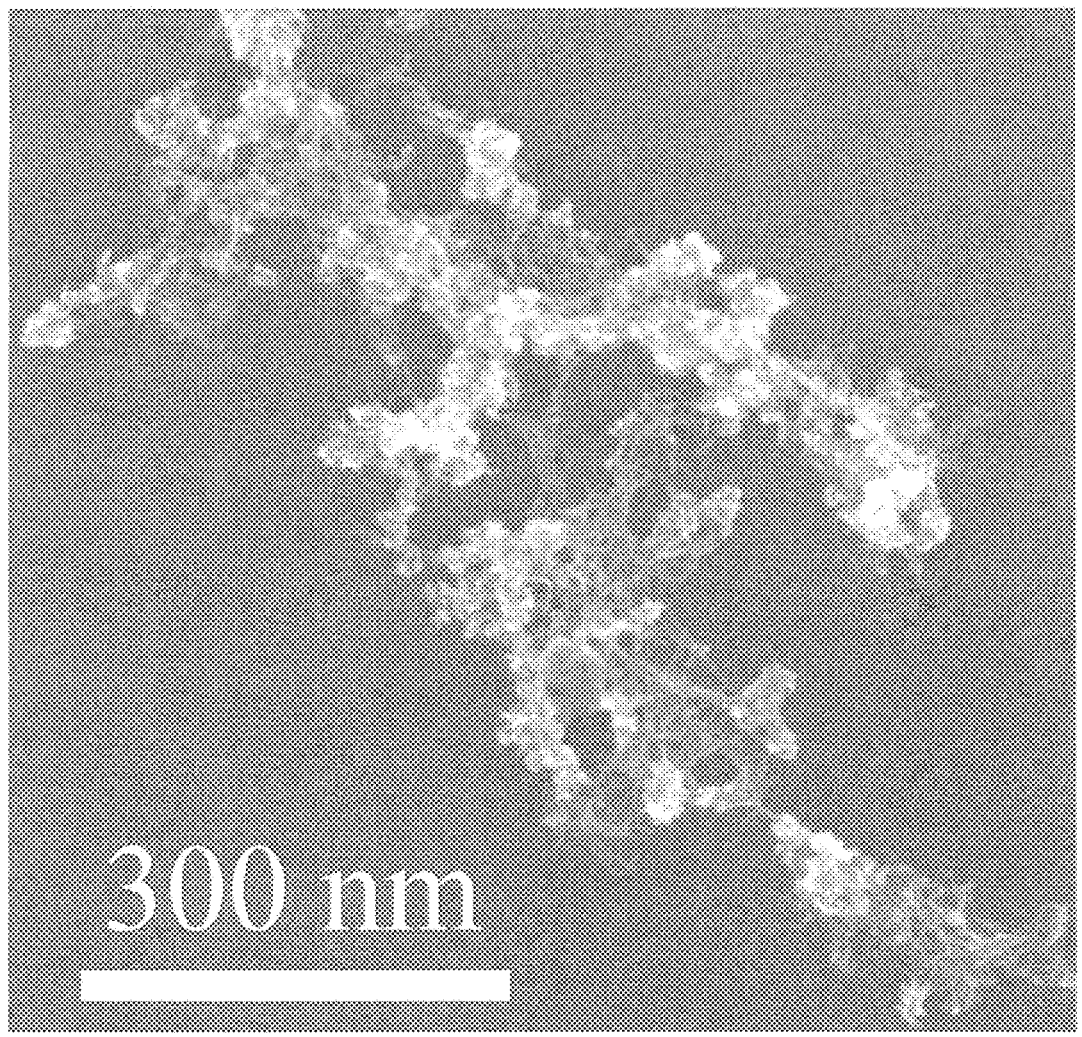

As shown in FIG. 9, unrefined nanowires that are washed in water become highly aggregated into a monolithic net-like structure and are encased in an amorphous residue. SEM images of the nanowires washed with acid according to the method described above demonstrate a much lower degree of aggregation, as shown in FIG. 10, when compared with the unrefined aggregated nanowires shown in FIG. 9. Indeed, an acid wash in accordance with an embodiment of the present invention allows for the resolution of individual nanowires and the corresponding ability to more uniformly coat the substrate. This improved dispersibility and nanostructure exposure can be attributed to the solubilization of amorphous platinum and platinum residue salts such as $PtCl_x$ and $PtO_x$. Moreover, the size of the acid-washed nanostructure decreases with increasing hydrochloric acid concentration, with this change in diameter attributable to a symmetrical etching of the exposed surfaces.

Figure 11:
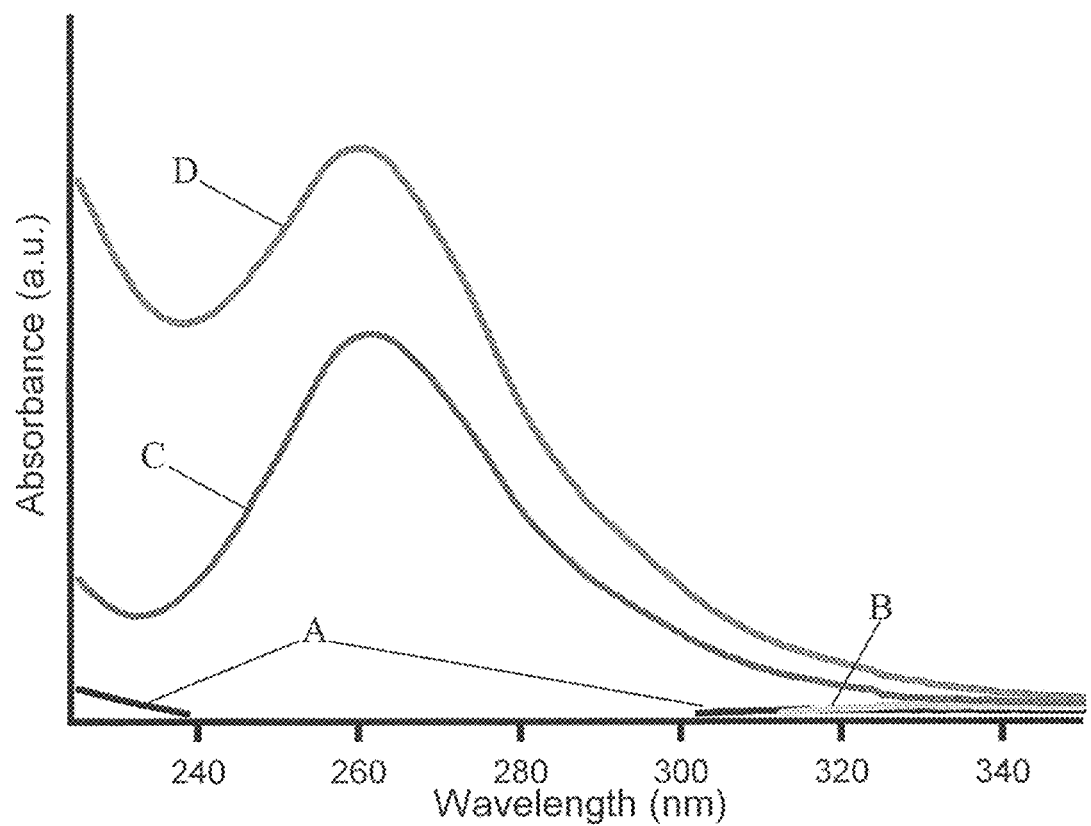
FIG. 11 is a graph of the Ultra Violet (UV)-visible spectra of solutions used to wash the nanostructures according to an embodiment of the present invention.

Further, FIG. 11 illustrates UV-visible spectroscopy performed on various wash solutions including: (A) ethanol; (B) water; (C) 6M HCl; and (D) 0.2 mg/mL $H_2PtCl_6$ standard. The wash solutions are used to purify the nanowires in order to determine the effect of the acid on the nanoscale platinum. Acid wash solutions, after precipitation of the nanowires, display a peak at 262 nm, consistent with the presence of dissolved $H_2PtCl_6$ under acidic conditions. It is noted that the spectrum is devoid of absorption peaks from $H_2PtCl_6$ when the acid wash is substituted with a water wash. Because no $H_2PtCl_6$ is observed in ethanol washes, the presence of $H_2PtCl_6$ in the acid wash can be attributed to the re-solubilization of platinum and of amorphous platinum residues by HCl. The concentration of $H_2PtCl_6$ is determined from Beer's law to be 0.52 mg/mL, indicating that approximately 2.5 mg of platinum residue and impurities are redissolved in the acid wash, thereby leaving a purified product. Hence, the quantity of redissolved platinum and, correspondingly, the progress of the acid wash may be measured in situ via UV-visible spectroscopy.

Limiting the etching process of the acid wash by quench achieves suitably exfoliated nanowires and produces stable nanowires with ultrathin diameters. Specifically, the unrefined aggregated nanowires are pre-dispersed into a minimal amount of alcoholic solvent in order to maximize the distribution of the nanowires and then the etching process is initiated with the addition of 6 M HCl to nanowires. Dispersing the nanowires into the acid solution results in the solubilization of amorphous platinum residues (e.g. $Pt_xO_y$ & $PtCl_x$), which exfoliate the nanowires, rendering the residues more dispersed into solution. The rate of etching can be controlled through the concentration of acid. Specifically, the rate of etching is increased with increasing concentration of acid from 1 to 6 M, with 6 M representing an optimized rate for the platinum nanoparticles and nanowires.

The progress of the etching process can be monitored visually by a color change of the transparent solution to a pale yellowish hue, corresponding to an emergence of redissolved platinum species (e.g. $H_xPtCl_y$). Similarly, the progress of the etching process may be quantitatively measured by the emergence of a peak at 262 nm present in the UV-visible absorption spectra, which is utilized in combination with the molar absorptivity of $H_2PtCl_6$ to calculate the precise quantity of platinum solubilized.

The UV-visible technique is particularly advantageous for the application of an industrial scale acid wash to allow precise control over the rate and degree of etching.

Upon sufficient etching, the etching process is quenched by precipitating the treated nanostructures from the acid and diluting the nanostructures and residual acid with excess ethanol, to lower the ionic strength of the solution, thereby rendering the acid less active towards dissolution of the platinum nanostructure. By contrast, if water is utilized to dilute the nanostructures and residual acid, the etching process continues, resulting in a loss of morphology and product quality.

The kinetics of the ORR on both 1-D nanowire and 0-D nanoparticle catalysts were performed using the thin-layer Rotating Disk Electrode (RDE) method. Specifically, the relevant catalysts are dispersed in water and deposited onto a glassy carbon RDE and the uniform catalyst layer.

Figure 12:
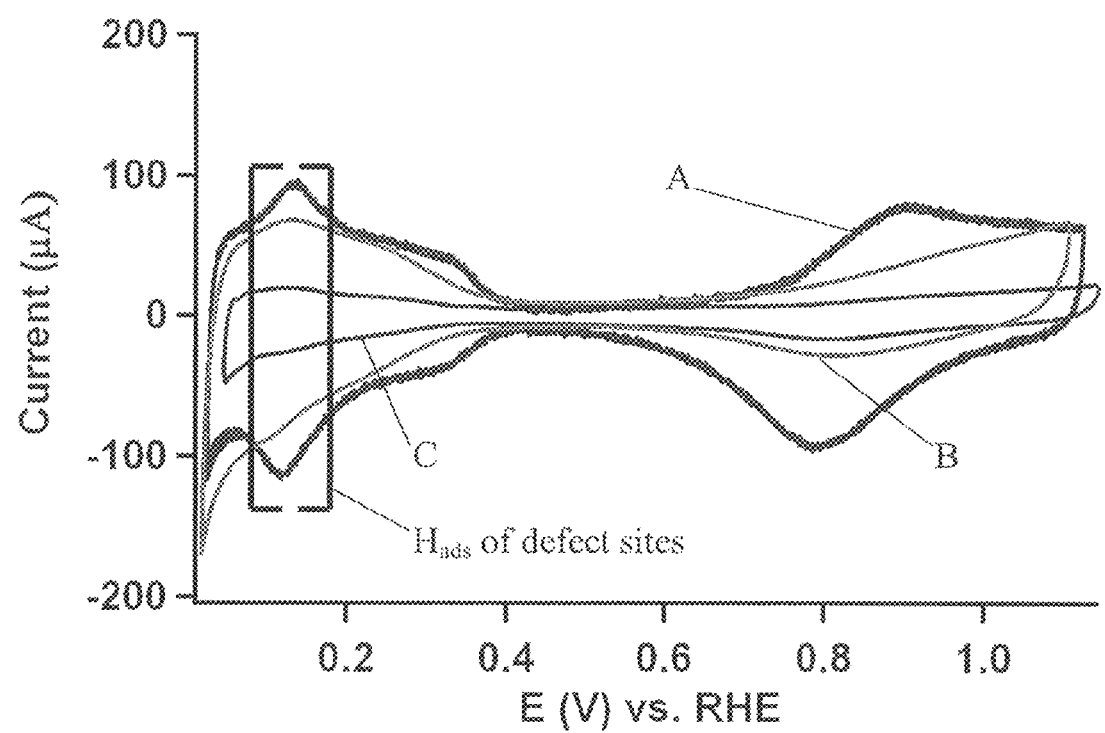
FIG. 12 is a graph of cyclic voltammograms obtained for synthesized nanostructures.

Initially, stationary electrode Cyclic Voltammograms (CVs) are obtained from RDEs loaded with commercially prepared nanowires (line "A" in FIG. 12); acid treated nanoparticles (line "B" in FIG. 12); and acid-treated platinum nanowires (line "C" in FIG. 12). All samples were prepared in deoxygenated 0.1 M $HClO_4$ solution at 50 mV/s and potentials are given with respect to a Reversible Hydrogen Electrode (RHE).

FIG. 12 is a graph illustrating CVs obtained from nanowires before and after acid washing as well as for acid-treated unsupported platinum nanoparticles each separately loaded onto a glassy carbon electrode. The peaks present on the CVs within the region of 0 to 0.2 V are consistent with hydrogen adsorption and desorption ($H_{ads}$), which provides useful insight into the structure and quality of the nanostructure's surface. Prior to acid treatment, the unrefined, aggregated nanostructures, shown by line "A", display an $H_{ads}$ profile that is similar to that of the Pt (110) and Pt (100) single crystal surfaces. Correspondingly, a considerable number of LCAs are present, as evidenced by the presence of a distinctive peak in the 0-0.2 V region highlighted in FIG. 12 by line "A". After treating the nanostructures with the acid treatment method described above, the intensity of the peak associated with LCAs is almost entirely suppressed as illustrated in FIG. 12 by lines "B" and "C", confirming removal of a considerable amount of LCAs and defect sites from the purified, exfoliated nanostructures.

Thus, the removal of extraneous, undesirable low-coordination sites can be attributed to the etching effect of the acid wash primarily, leaving behind a desirable smooth, crystalline, and defect-free surface in addition to removing undesirable residues. Moreover, the shape of the acid-treated ultrathin nanowire CV curve (shown in FIG. 12 by line "C") is close to that of a characteristic bulk platinum (111) surface (FIG. 1), which has a high intrinsic activity towards the ORR. Previous analysis of ORR kinetics at bulk single crystals of platinum has revealed that the most active facet is, in fact, the (111) facet.

Figure 13:
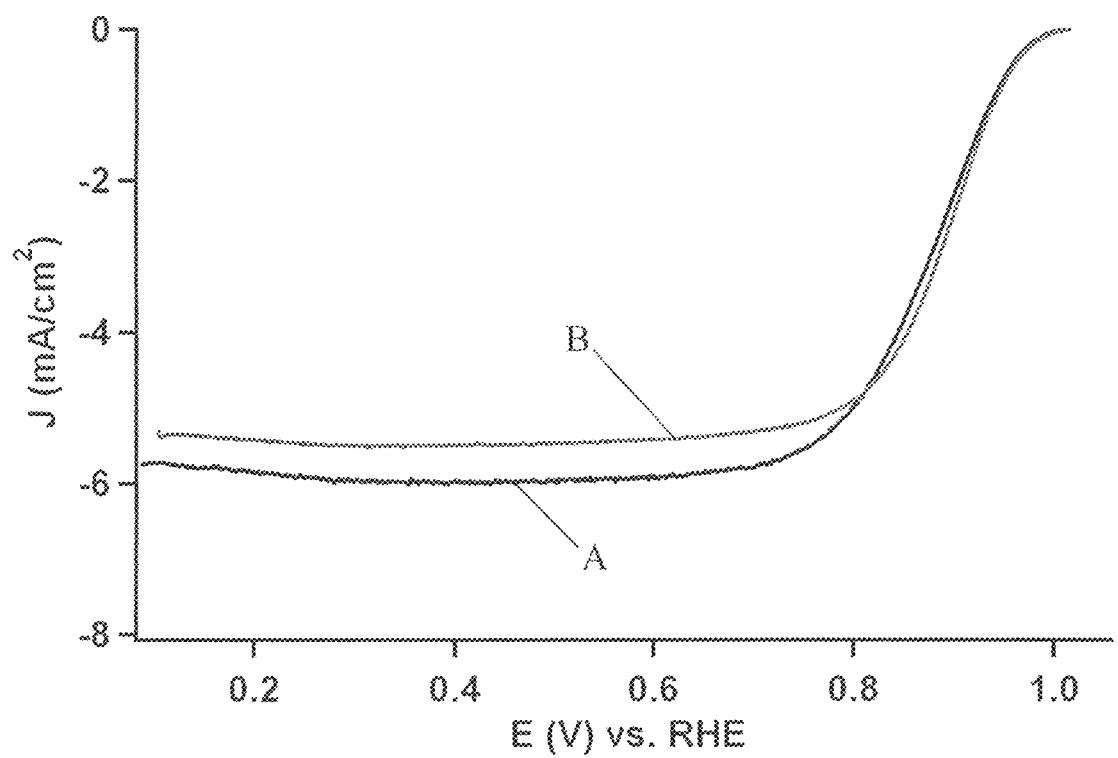
FIG. 13 is a graph illustrating a polarization curve for the acid-washed ultrathin platinum nanowires as compared with commercial 3.3 nm platinum nanoparticles 46.4 wt. % on a Vulcan carbon support both on a glassy carbon Rotation Disk Electrode (RDE)

As illustrated in FIG. 13, the ORR activity for the nanowire samples is measured electrochemically by obtaining polarization curves in an oxygen saturated 0.1 M $HClO_4$ solution. Line "A" in FIG. 13 is commercially available supported platinum nanoparticles and line "B" is platinum nanowires prepared according to an embodiment of the present invention. The nanowires show an ORR onset between 0.7 and 0.8 V with nanostructured platinum electrocatalysts. The polarization curves also show that there is a shift in curve B toward higher potentials when compared with commercial nanoparticles, a trend which suggests a lower ORR overpotential since the thermodynamic potential of ORR is 1.23 V.

Figure 14:
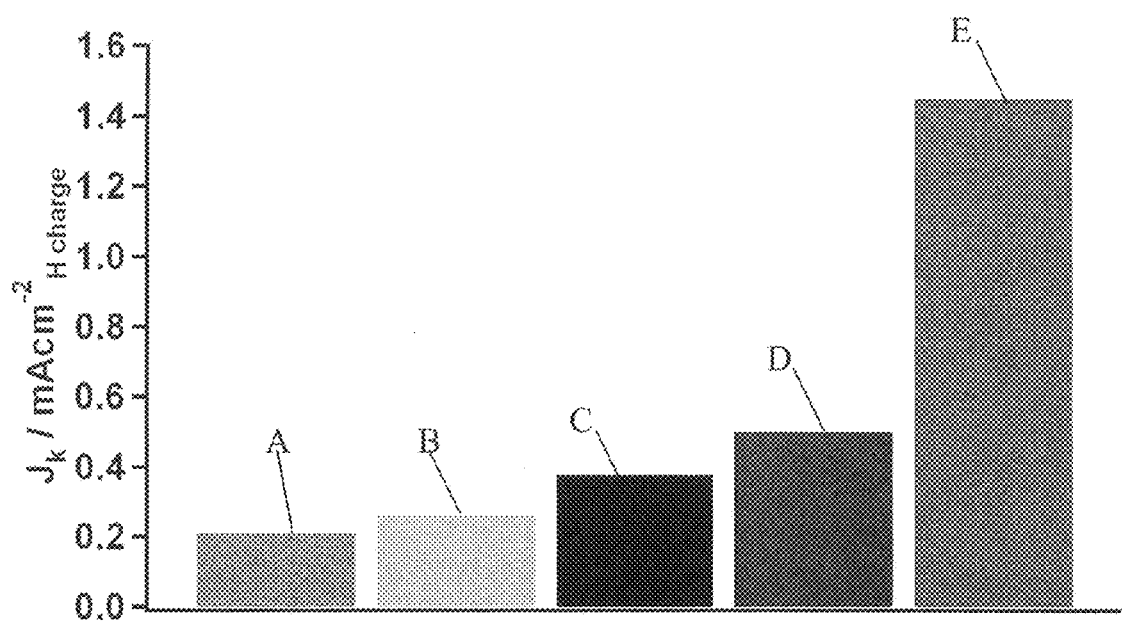
FIG. 14 illustrates Electrochemical Surface Area Activity (ECSA) at 0.9 V for acid-treated ultrathin nanowires as compared with commercial carbon supported nanoparticles, acid-treated platinum nanoparticles, previously synthesized platinum nanotubes, and ultrathin nanowires without acid treatment.

FIG. 14 shows that the nanostructures of the present invention display an enhanced specific activity compared with commercial carbon-supported nanoparticle analogues, highlighting increased electrocatalytic performance of nanostructures of the present invention. In FIG. 14, measured kinetic currents are normalized to the real surfaces areas so as to probe the intrinsic activity for: (A) commercially available supported nanoparticles; (B) acid treated platinum nanoparticles; (C) platinum nanotubes; (D) unrefined platinum nanowires; and (E) platinum nanowires prepared according to an embodiment of the present invention.

Figure 15:
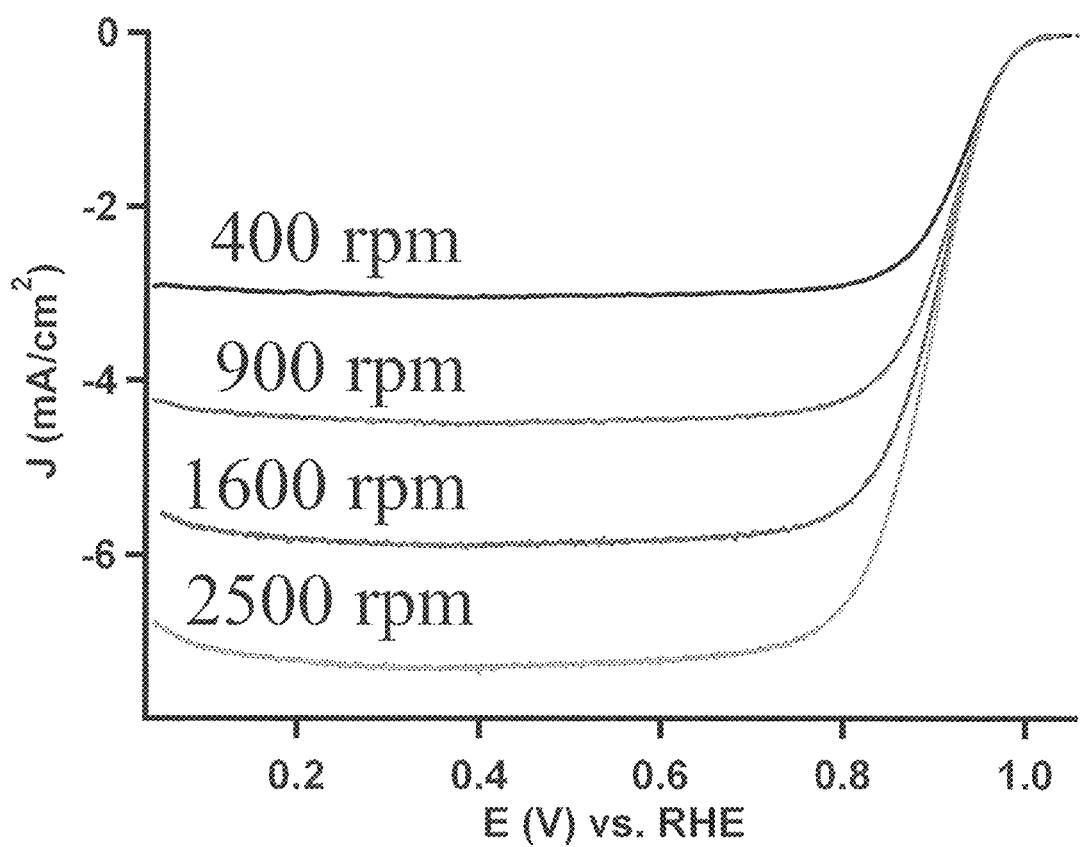
FIG. 15 illustrates polarization curves of the platinum nanowire electrode at various rates of rotation.
Figure 16:
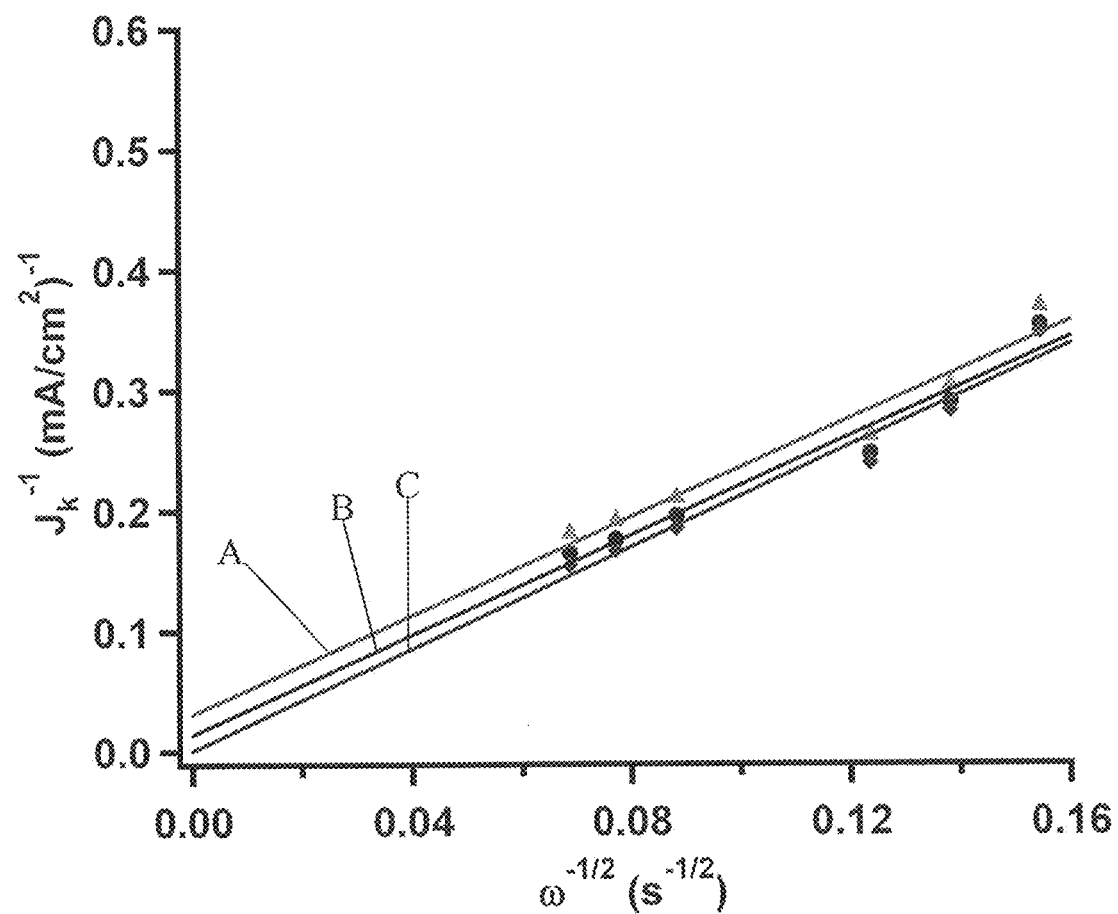
FIG. 16 provides Koutecky-Levich plots at different potentials obtained from the data in FIG. 15.

FIG. 15 illustrates polarization curves of acid treated nanostructures of the present invention obtained at various rates of rotation. To further explore the kinetics of ORR at the ultrathin platinum nanowire electrode, a Koutecky-Levich (K-L) plot is obtained, as shown in FIG. 16, with potentials of: (A) 850 mV; (B) 830 mV; and (C) 810 mV, constructed from the polarization curves in FIG. 15. The K-L plot is fitted using Equation (1):

$$\frac{1}{j} = \left(\frac{1}{j_k} + \frac{1}{j_D}\right) = \left(\frac{1}{j_k} + \frac{1}{B\omega^{1/2}}\right) \quad (1)$$

where j is a measured disk current density, $j_K$ is a kinetic current density, $\omega$ is rotation speed, and B is a constant determined by Equation (2):

$$B = 0.62 n F A D_{O_2}^{2/3} v^{-1/6} C_{O_2} \quad (2)$$

Using Equation (1), the experimental value of the B-factor is determined to be 0.096 $mA/s^{1/2}$. A value of 0.092 $mA/s^{1/2}$ for an ideal 4e$^-$ process is calculated using Equation (2) based on the published values of the diffusion coefficient of $O_2$ ($D_{O2}=1.93 \cdot 10^{-5}$ cm$^2$ s$^{-1}$), the kinetic viscosity of the solution v (v=1.009$\cdot 10^{-2}$ cm$^2$ s$^{-1}$), the concentration of dissolved $O_2$ in solution ($C_{O2}=1.26 \cdot 10^{-3}$ mol L$^{-1}$),[2] Faraday's constant (F), and electrode geometric area (A). The close agreement between the experimentally determined value (0.096 $mA/s^{1/2}$) and the calculated ideal value (0.092 $mA/s^{1/2}$) confirms that the reaction mechanism of the nanowire system most closely follows the ideal 4e$^-$ process expected for oxygen reduction.

Furthermore, the data at each potential closely fits the K-L linear relationship and a consistent slope (i.e. consistent B factor) is maintained over all of the potentials. Taken together, these observations suggest first-order kinetics with respect to molecular oxygen, which is highly desirable.

Figure 17:
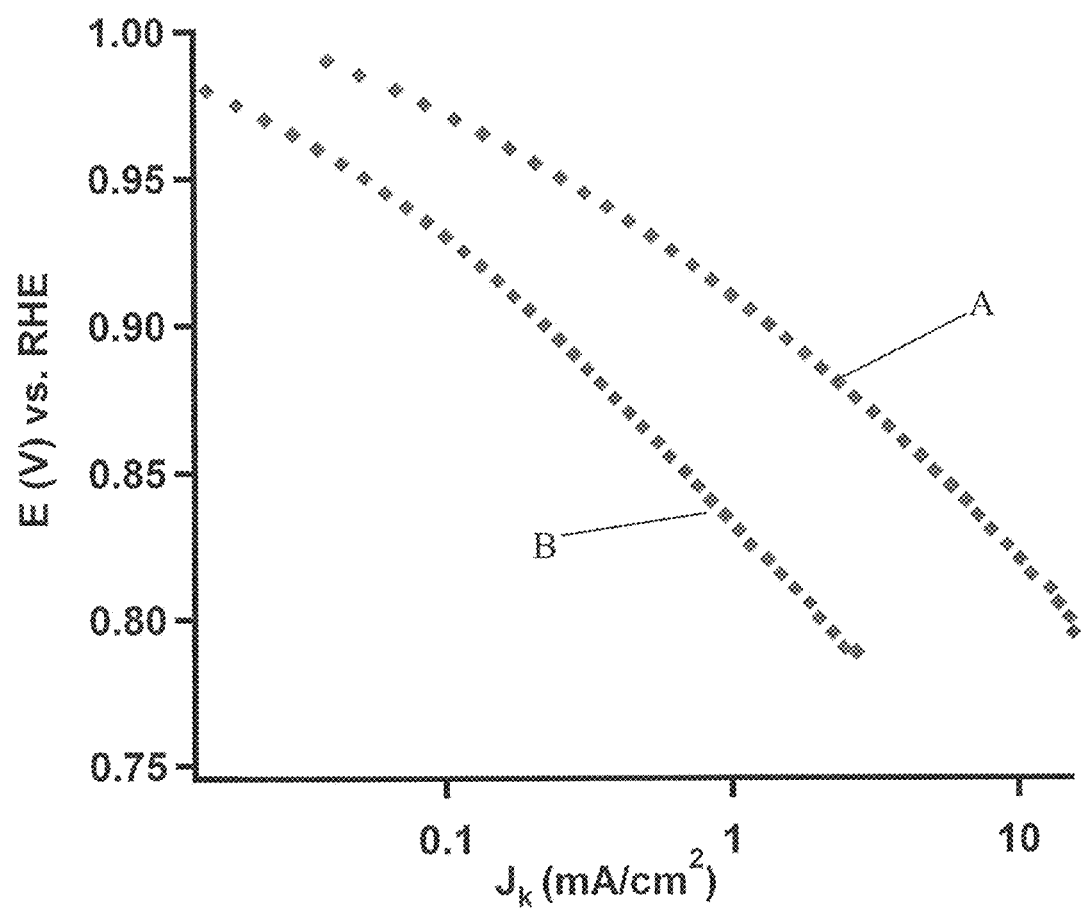
FIG. 17 is a Tafel plot of commercially supported platinum nanoparticles and acid-treated, unsupported ultrathin platinum nanowires.

Diffusion-current-corrected Tafel plots are provided in FIG. 17 of: (A) acid-treated platinum nanowires; and (B) commercial platinum nanoparticles, with the kinetic currents normalized to specific surface areas obtained from the K-L plots. The Tafel plots reveal that the acid-treated nanowires maintain significantly higher kinetic currents over the entire range of operating potentials. Overall, these observations provide additional evidence that acid-treated nanostructures in accordance with an embodiment of the present invention display greatly enhanced ORR kinetics.

This improved activity obtained by ultrathin nanowires can be attributed to a contraction of the surface of the ultrathin nanowires that promotes enhanced ORR activity by enhancing O—H bonding formation kinetics. Previous theoretical and experimental studies have demonstrated that small-diameter noble metal nanowires undergo a surface contraction as a diameter decreases below a critical value of approximately 2 nm. Contraction of the platinum surface prepared as described above has been shown both experimentally and theoretically to improve the surface ORR activity in view of the conventional understanding that such contractions weaken the binding of oxygen and increase the kinetics of O—H bond formation. Thus, the surface reconstruction of the small diameter wires contributes to the observed enhancement of their intrinsic activity towards ORR.

Furthermore, the improvement in the activity of the acid-treated ultrathin platinum nanowires and nanoparticles can be attributed to the novel use of an acid wash protocol. As described in regards to the cyclic voltammetry of FIG. 12, the removal of undesirable residues, LCAs, and defects exposes smooth crystalline planes. The residual, smooth surfaces possess a $H_{ads}$ adsorption region that is analogous to the highly active Pt (111) (FIG. 1) surface and also possess relatively few surface LCAs and defect sites rendering them much more active towards the ORR. Smooth, defect free, and crystalline surfaces display an ORR onset at higher potentials, which increases the underlying kinetics of the ORR reaction.

Noble metal nanostructures prepared in accordance with the embodiments described above, are useful in applications including fuel cells for improved catalytic performance, carbon dioxide reduction electrocatalysis, heterogeneous catalysts, sensors and sensor arrays, hydrogen storage, information storage, computing and electronic devices, tribology, manipulation of biological materials, including biosensors, and actuators.

While the invention has been shown and described with reference to certain embodiments of the present invention thereof, it will be understood by those skilled in the art that various changes in form and details may be made therein without departing from the spirit and scope of the present invention as defined by the appended claims and equivalents thereof.

What is claimed is:

1. A process for refining a nanostructure, the process comprising:
    suspending an unrefined nanostructure with a solvent;
    dispersing the suspended nanostructure in an acidic solution; and
    agitating the acidic solution to produce a refined nanostructure,
wherein the nanostructure comprises a noble metal combined with a transition metal,
wherein refining comprises reducing residues from the nanostructures, wherein the residues comprise partially reduced noble metal compounds, wherein the partially reduced noble metal compounds comprise noble metal oxides and halides, wherein the nanostructure is refined.

2. The process of claim 1, wherein dispersing the suspended nanostructure includes at least one of physical agitation, mechanical agitation, sonication, stirring and homogenization.

3. The process of claim 1, wherein the acidic solution includes an acid that ionizes in water.

4. The process of claim 1, wherein the acidic solution includes one of hydrochloric acid, hydroiodic acid, hydrobromic acid, sulfuric acid, perchloric acid, phosphoric acid, p-toluenesulfonic acid, chloric acid, bromic acid, perbromic acid, iodic acid, periodic acid, fluorosulfuric acid, and triflic acid.

5. The process of claim 1, further comprising:
    assessing dissolution based on a characteristic of the acidic solution; and
    quenching upon reaching a purification threshold, based on the assessing.

6. The process of claim 5, wherein assessing the dissolution comprises one of spectroscopy and visual assessment.

7. The process of claim 5, wherein quenching comprises:
    isolating the nanostructure; and
    dispersing the isolated structure in a polar solvent.

8. The process of claim 7, wherein isolating the nanostructure comprises at least one of filtration, electric-field induced processing, sedimentation and precipitation.

9. The process according to claim 1, wherein refining the nanostructure further comprises reducing surface defects and low coordination atoms.

10. The process according to claim 1, wherein the nanostructure is a platinum nanowire having a diameter of 0.9 to 2 nm.

11. The process according to claim 10, wherein the diameter is 0.9 to 1.7 nm.

12. The process according to claim 10, wherein the nanowire has an oxygen reduction reaction onset between 0.7 and 0.8V.

* * * * *